(12) United States Patent
Miller et al.

(10) Patent No.: US 6,366,239 B1
(45) Date of Patent: Apr. 2, 2002

(54) PHASE STABILIZATION IN ADAPTIVE ARRAYS

(75) Inventors: Thomas W. Miller, Yorba Linda; Christopher W. Reed, Novato, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/637,523

(22) Filed: Aug. 10, 2000

(51) Int. Cl.$^7$ .................................................. H01Q 3/26
(52) U.S. Cl. ....................................... 342/372; 342/378
(58) Field of Search .................................. 342/378, 372, 342/376; 343/757

(56) References Cited

U.S. PATENT DOCUMENTS 4,488,155 A * 12/1984 Wu ............................. 342/376

* cited by examiner

Primary Examiner—Thomas H. Tarcza
Assistant Examiner—Fred H Mull

(74) Attorney, Agent, or Firm—Leonard A. Alkov; Glenn H. Lenzen, Jr.

(57) ABSTRACT

A phase-stabilized adaptive array system with a moving antenna array and a plurality of signal channels coupled to the antenna array, each for producing a channel signal. Each channel has adaptive signal weighting apparatus for weighting the channel signal by a channel weight. The system includes combining apparatus for combining the weighted channel signals to form a beam signal, and phase compensation apparatus for applying phase compensation weights to the array signals or the beam signal which vary in dependence on the array position such that the response to a signal at a known direction is held substantially constant while the antenna is moved, or as the weights are updated. A method for operating an adaptive array includes rotating the antenna array with respect to a target, providing a plurality of signal channels coupled to the antenna array, each for producing a channel signal, adaptively weighting each channel signal by a channel weight, and combining the weighted channel signals to form a beam signal. The method further includes, for phase stabilizing the response to a target at a given angular position, applying phase compensation weights to the array signals or the beam signal which vary in dependence on the antenna position such that the response to a signal at a known direction is held substantially constant while the antenna rotates, or as the weights are updated.

7 Claims, 2 Drawing Sheets

PHASE STABILIZATION IN ADAPTIVE ARRAYS

TECHNICAL FIELD OF THE INVENTION

This invention relates to adaptive arrays, and more particularly to techniques for stabilizing the gain of an adaptive array on a desired signal while maintaining nulls on interferers.

BACKGROUND OF THE INVENTION

Consider an adaptive array on a rotating platform. It can collect data over a coherent processing interval to estimate the statistics of interference plus noise and produce a weight to attenuate it. As the antenna rotates, the beam formed will have a response to the target or clutter that varies. This modulation reduces the ability of clutter cancellation and target detection. There are currently no methods that address this issue.

Another situation arises for an adaptive array in a jamming environment that varies with time. For example, time variations can arise from jammer motion, antenna motion, or jammer waveform variations. The adaptive array beamsteering weights must be updated periodically to maintain nulls on the jammer, which introduces a time variation in the antenna pattern. This will modulate the desired signal and clutter.

This invention provides a solution to these problems.

SUMMARY OF THE INVENTION

This invention stabilizes the gain of an adaptive array on a desired signal, while maintaining nulls on interferers. This is accomplished by multiplying the adaptive weight by a complex scalar that varies as the array rotates, or as the adaptive weights are updated to maintain nulls in a changing jammer field. This ensures that the response to a signal at a known direction is held constant during the rotation, or as the weights are updated. The invention is useful even in systems where the rotation or update is rapid.

A phase-stabilized adaptive array system for a rotating sensor array is described. The system includes an antenna array, a plurality of signal channels coupled to the antenna array, each for producing a channel signal, each channel including adaptive signal weighting apparatus for weighting the channel signal by a channel weight. The system further includes combining apparatus for combining the weighted channel signals to form a beam signal. In accordance with an aspect of the invention, the system further includes phase compensation apparatus for applying phase compensation weights to the array signals or the beam signal which vary in dependence on the antenna position such that the response to a signal at a known direction is held substantially constant while the sensor array is rotated, or as the weights are updated.

A further aspect of the invention is in a method for operating an adaptive array comprising the steps of rotating the antenna array with respect to a target, providing a plurality of signal channels coupled to the antenna array, each for producing a channel signal, adaptively weighting each channel signal by a channel weight, and combining the weighted channel signals to form a beam signal. The method further includes, for phase stabilizing the response to a target at a given angular position, the step of applying phase compensation weights to the array signals or the beam signal which vary in dependence on the antenna position such that the response to a signal at a known direction is held substantially constant while the sensor array is rotated, or as the weights are updated.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
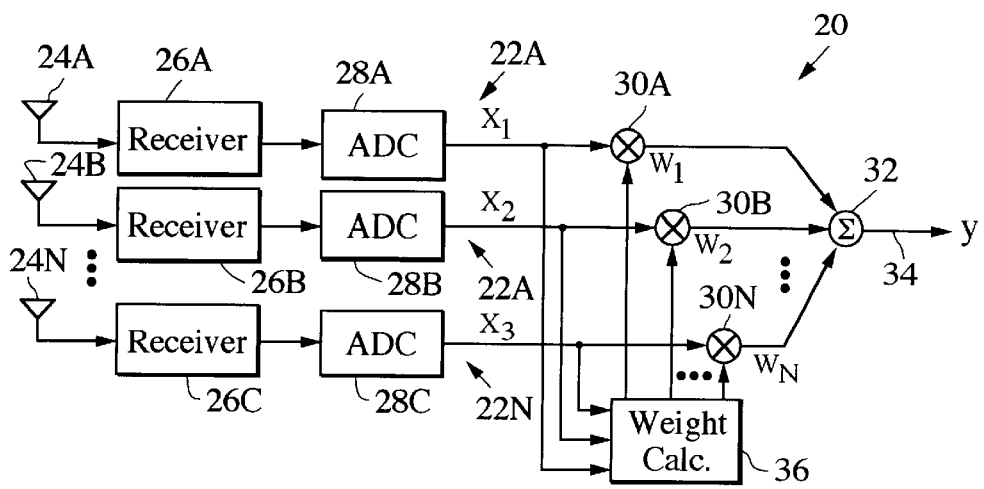
FIG. 1 is a schematic diagram of an unstabilized adaptive array system.

An unstabilized adaptive array system 20 is shown in the simplified schematic block diagram of FIG. 1. The system includes a plurality of channels 22A, 22B . . . 22N. Each channel includes an antenna element (24A, 24B . . . 24N), a receiver (26A, 26B . . . 26N), analog-to-digital converter (ADC) (28A. 28B . . . 28N), and a weight multiplier (30A, 30B . . . 30N). The channels can be from a single antenna or sensor (for digital beamforming systems) or from many antennas added together (the output of an analog beamforming system). The digitized input channel signals $x_1, x_2 \ldots x_N$ are output from the respective ADCs, and are multiplied by the weights $w_1, w_2 \ldots w_N$. The weighted input channel signals are summed at summer 32 to produce the array signal y at 34. A weight calculator 36 is responsive to the channel signals $x_1, x_2 \ldots x_N$ to adaptively calculate the weights $w_1, w_2 \ldots w_N$ applied to the respective channels. Define the complex response of the input channels (either single sensor or formed beams) to a signal arriving from direction θ, when the antenna is rotated an angle of φ, as the vector $$d(\theta,\phi)=[d_1(\theta,\phi)d_2(\theta,\phi) \ldots d_N(\theta,\phi)]^T \quad \text{(eq.1)}$$

where $d_n(\theta,\phi)$ is the response of the nth channel to the signal arriving from direction θ, when the antenna is rotated an angle of φ. This complex response is not the data received by the ADCs 28A–28C, but can be determined analytically or through sensor calibration, e.g. in an anechoic chamber. The adaptive weight vector w (which can be determined by any adaptive array method) is denoted as $$w=[w_1 w_2 \ldots w_n]^T \quad \text{(eq.2)}$$

The adaptive weights are determined and held constant for a certain interval of time, in a block-adaptive approach. The dependence on time is not explicitly shown to simplify the notation.

The phase stabilization constraint in accordance with an aspect of this invention requires creation of a new time varying weight, $w_{new}(\theta,\phi)$, where φ is the angle of rotation of the antenna, which corresponds directly to time, such that $$w_{new}(\theta,\phi)^H d(\theta,\phi)=K \quad \text{(eq.3)}$$

when the target is at the direction θ, the antenna is rotated φ, and K is an arbitrary complex constant response. The value for K is chosen by the system designer based on the dynamic range of the system, and can typically be set to 1. This can be implemented by choosing an initial adaptive wand simply identically adjusting the amplitude and phase of each element of w as the antenna rotates.

There are at least two primary techniques by which the phase adjustment of each element of w as the antenna rotates can be implemented. The simplest to visualize simply involves replacing w with the time-varying $w_{new}(\theta,\phi)$. This technique is illustrated in the schematic block diagram of FIG. 2, which illustrates a stabilized adaptive array system 50. The system includes a plurality of channels 52A, 52B . . . 52N. Each channel includes an antenna element (54A, 54B . . . 54N), a receiver (56A, 56B . . . 56N), analog-to-digital converter (ADC) (58A. 58B . . . 58N) producing input channel signals $x_1, x_2 \ldots x_N$, and a weight multiplier (60A, 60B . . . 60N). The weighted input channel signals are summed at summer 62 to produce the array signal at 64. A weight calculator 66 is responsive to the input channels signals $a_1, a_2 \ldots a_N$, and adaptively calculates the weights $w_{new1}(\theta,\phi), w_{new2}(\theta,-\phi) \ldots w_{newN}(\theta,\phi)$ applied to the respective channels. In this case, the stabilized weight is given by $$w_{new}(\theta, \phi) = \frac{K^*}{(w^H d(\theta, \phi))^*} w \qquad \text{(eq. 4)}$$

where "*" denotes the complex conjugate of a scalar (i.e., if x=a+jb, x*=a-jb), and H denotes the complex conjugate transpose of a vector. Eq. 4 shows how the weights are affected by antenna motion. Specifically, in the reciprocal, the inner product of w and d produces a quantity whose amplitude and phase changes as the antenna rotates, because the response vector d changes. Therefore, the amplitude and phase of the $w_{new}$ coefficients change as the antenna rotates.

Although the goal of this invention is the stabilization of phase, it will in general be necessary to adjust both the amplitude and phase of the weight vector.

Figure 2:
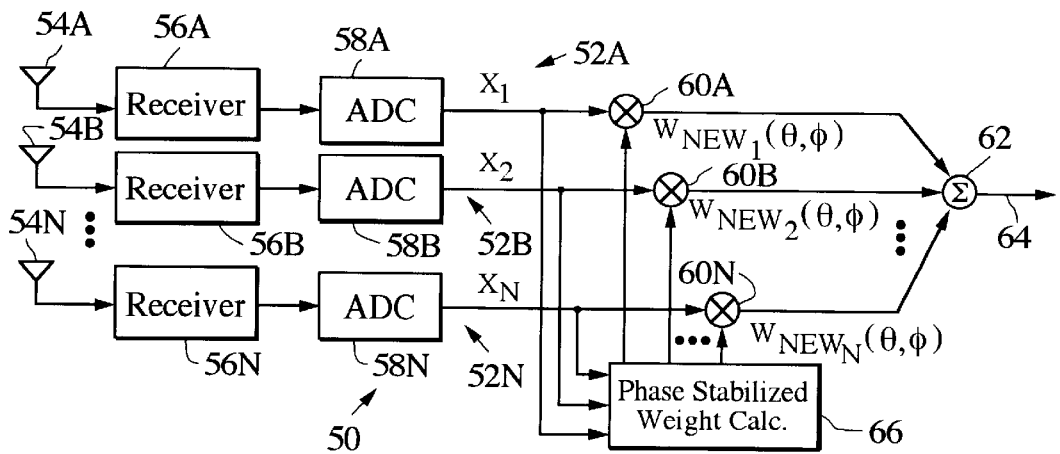
FIG. 2 is a schematic diagram of a stabilized adaptive array system embodying the invention.
Figure 3:
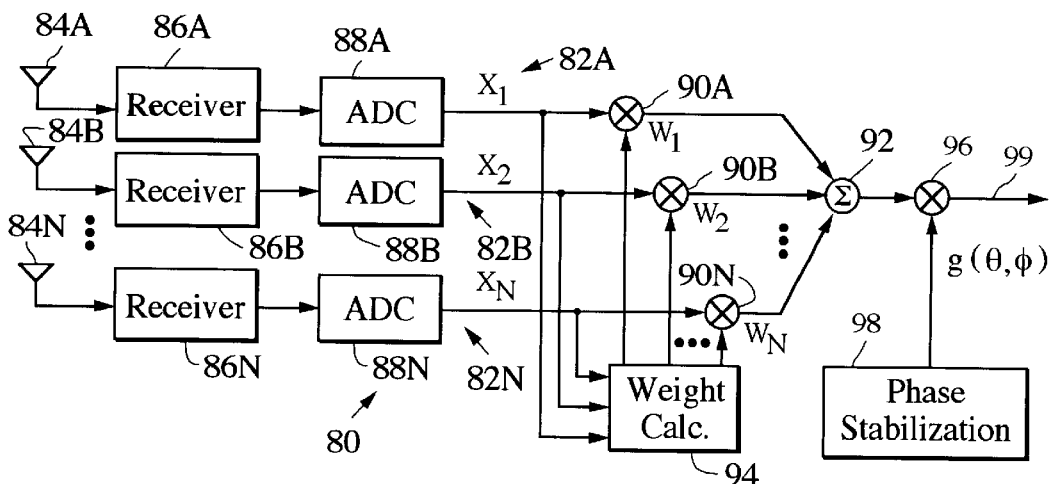
FIG. 3 is a schematic diagram of an alternate embodiment of a stabilized adaptive array system in accordance with the invention.

Since the embodiment of FIG. 2 achieves the phase stabilization by effectively multiplying each element of the weight vector by a single term, and beamforming is a linear operation, the number of operations can be reduced by performing the computation after beamforming. This second technique is illustrated in the simplified schematic block diagram of FIG. 3, illustrating a further embodiment of a stabilized adaptive array system 80. The system includes a plurality of channels 82A, 82B . . . 82N. Each channel includes an antenna element (84A, 84B . . . 84N), a receiver (86A, 86B . . . 86N), analog-to-digital converter (ADC) (88A, 88B . . . 88N) producing the digitized input channel signals $a_1, a_2 \ldots a_N$, and a weight multiplier (90A, 90B . . . 90N). The weighted input channel signals are summed at summer 92. A weight calculator 94 is responsive to the signals $a_1, a_2 \ldots a_N$, and adaptively calculates the weights $w_1, w_2 \ldots w_N$ applied to the respective channels. In this embodiment, these weights are as calculated for the unstabilized array of FIG. 1.

The output of the summer 92 is in turn multiplied at multiplier 96 by the gain correction term $g(\theta,\phi)$, which is supplied by the phase stabilization circuit 98, to produce the stabilized array output at 100.

In the case illustrated in FIG. 3, the gain correction term is given, as above, by $$g(\theta, \phi) = \frac{K}{w^H d(\theta, \phi)} \qquad \text{(eq. 5)}$$

Figure 4:
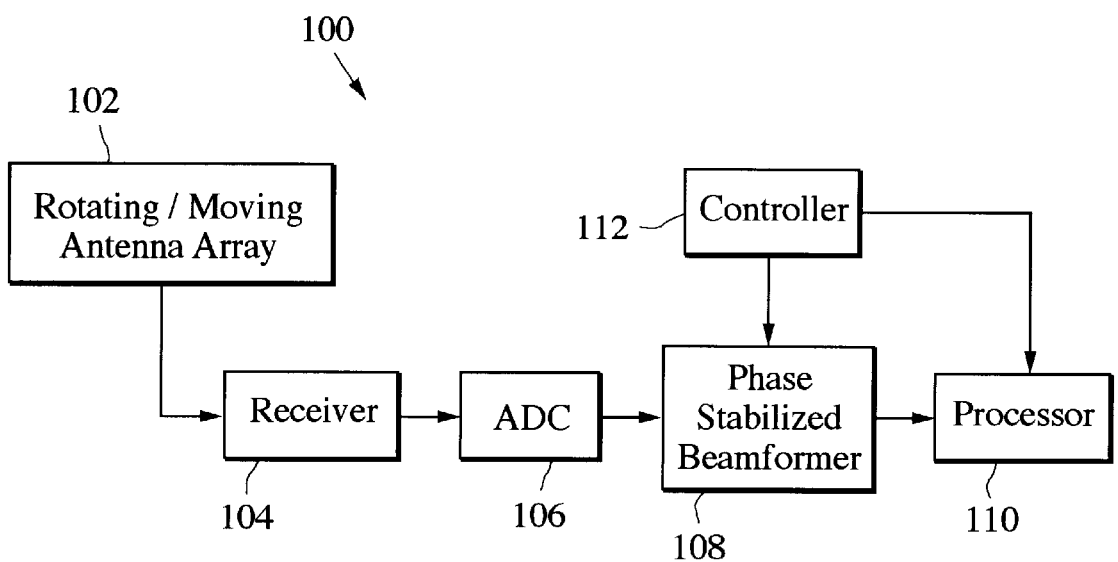
FIG. 4 is a schematic diagram of a generalized sensor system in accordance with the invention.

The present invention can be employed in any system that uses an adaptive array on a rotating platform, or more generally with respect to systems wherein the array is movable with respect to a target. The invention can be used for any array that physically moves relative to a target, e.g. for an array that rotates by any amount, or for an array on a platform that is maneuvering. This invention is useful for both mechanically scanned and electronically scanned arrays. Both techniques of scanning a beam are well known to those skilled in the art. FIG. 4 shows in a generalized form a block diagram of such a system 100. This sensor system includes a rotating or moving antenna array 102, a receiver system 104 for processing multiple channels from the array, an ADC function 106 for converting the analog signals from the receiver system into digital form, a phase stabilized beamformer 108 which uses phase stabilized weights as described above regarding either the embodiments of FIGS. 2 or 3, and a system processor 110 for processing the resultant signals. The system includes a controller function 112, which can be employed to provide the desired response vector $d(\theta,\phi)$ (eq. 1) and control the processing functions.

Figure 5:
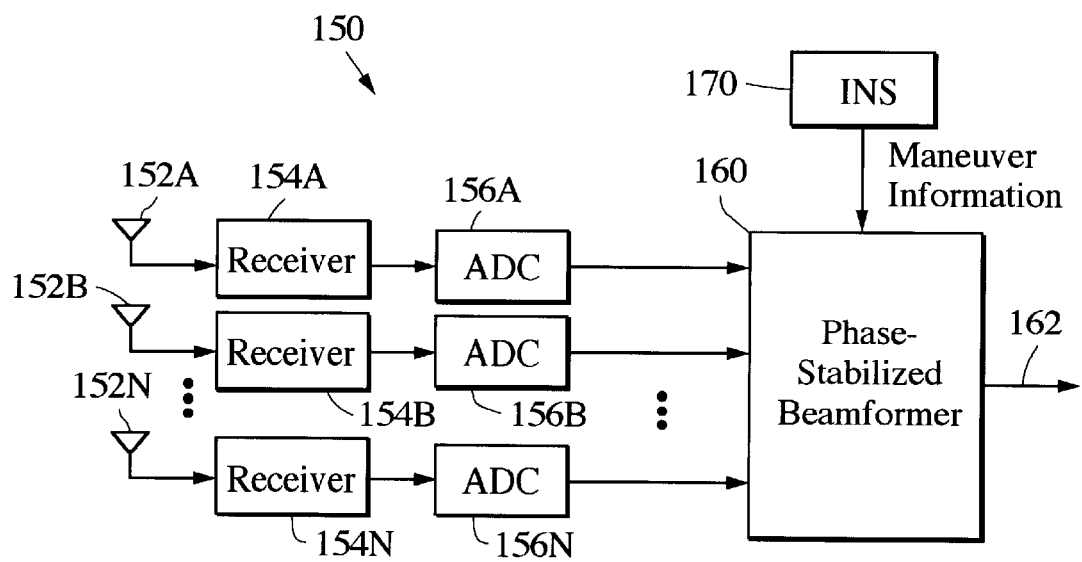
FIG. 5 is a simplified block diagram of an air borne sensor system embodying the invention.

The invention can also be applied to maneuvering airborne adaptive arrays, if the maneuver is known by the signal processor, which typically performs all processing tasks following the ADC function. An adaptive airborne radar system will not perform well if the aircraft is maneuvering. In particular, fighter aircraft are subject to high levels of acceleration. If the maneuver is known by the signal processor, e.g. if it receives data from the aircraft's navigation system, then the adapted array response can be held constant using this invention. Such an airborne array system 150 is illustrated in FIG. 5. The system includes the antenna elements 152A, 152B . . . 152N, a bank of receivers 154A, 154B . . . 154N, and corresponding ADCs 156A, 156B . . . 156N. The digitized outputs are processed by the phase-stabilized beamformer 162, which receives maneuver information from the aircraft inertial navigation system (INS) 170. The maneuver information is used to determine the appropriate phase-stabilized weights to be applied by the beamformer, which produces an output signal 162 which is phase-stabilized to compensate for the aircraft maneuvers.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A phase-stabilized adaptive array, comprising:
   a moving antenna array;
   a plurality of signal channels coupled to the antenna array, each for producing a channel signal, each channel including adaptive signal weighting apparatus for weighting the channel signal by a channel weight;
   combining apparatus for combining the weighted channel signals to form a beam signal; and
   phase compensation apparatus for applying phase compensation weights to the array signals or the beam signal which vary in dependence on the antenna array position such that the response to a signal at a known direction is held substantially constant while the antenna array is moved, or as the weights are updated.

2. The system of claim 1 wherein the array is a rotating array, wherein the phase compensation apparatus provides a set of channel weights defined as the vector $$w_{new}(\theta, \phi) = \frac{K^*}{(w^H d(\theta, \phi))^*} w$$

to a signal arriving from direction θ, when the antenna is rotated an angle of φ, and where $d_n(\theta,\phi)$ is the response of the nth channel to the signal arriving from direction θ, when the antenna is rotated an angle of φ.

3. A phase-stabilized adaptive array, comprising:
a moving antenna array;
a plurality of signal channels coupled to the antenna array, each for producing a channel signal, each channel including adaptive signal weighting apparatus for weighting the channel signal by a channel weight;
combining apparatus for combining the weighted channel signals to form a beam signal; and
gain compensation apparatus for applying gain correction terms to the beam signal which vary in dependence on the antenna array position such that the response to a signal at a known direction is held substantially constant while the antenna array is moved.

4. The system of claim 3 wherein the gain compensation apparatus includes a multiplier for multiplying the beam signal by the gain correction terms, and an apparatus for supplying the gain correction terms $g(\theta,\phi)$ such that $$g(\theta, \phi) = \frac{K}{w^H d(\theta, \phi)}$$

where the target signal is at angle θ and the beam is at angle φ.

5. A rotating adaptive array, including an adaptive weighting apparatus for applying weights to signals received by the array, a gain stabilization apparatus adapted to stabilize the gain of the adaptive array on a desired signal, while maintaining nulls on interferers, the apparatus including a multiplication apparatus for multiplying the adaptive weight by a complex constant that varies as the array rotates, or as the adaptive weights are updated to maintain nulls in a changing jammer field, to ensure that the response to a signal at a known direction is held constant during the rotation, or as the weights are updated.

6. A rotating adaptive array, comprising:
an antenna array;
a plurality of signal channels coupled to the antenna array, each for producing a channel signal, each channel including adaptive signal weighting apparatus for weighting the channel signal by a channel weight; and
a phase compensation apparatus for applying phase compensation weights to the array signals which vary as the array rotates.

7. In a method for operating an adaptive array comprising the steps of rotating the antenna array with respect to a target, providing a plurality of signal channels coupled to the antenna array, each for producing a channel signal, adaptively weighting each channel signal by a channel weight, and combining the weighted channel signals to form a beam signal, an improvement for phase stabilizing the response to a target at a given angular position, comprising the step of:
applying phase compensation weights to the array signals or the beam signal which vary in dependence on the beam scan position such that the response to a signal at a known direction is held substantially constant while the antenna array rotates, or as the weights are updated.

* * * * *